US012595377B2

(12) United States Patent
Knoote et al.

(10) Patent No.: US 12,595,377 B2
(45) Date of Patent: Apr. 7, 2026

(54) RETROREFLECTIVE AQUEOUS PSEUDOPLASTIC GEL COMPOSITION FOR INDUSTRIAL SPRAYING

(71) Applicant: Ink Invent IP B.V., Nieuwegein (NL)

(72) Inventors: Jacques Arthur Knoote, Zoetermeer (NL); Paul Willem Mijnen, Utrecht (NL); Harald Paul Kerres, Zoetermeer (NL); Philippus Jacob Muis, Andel (NL); Menno Arthur Knoote, Voorburg (NL)

(73) Assignee: INK INVENT IP B.V., Nieuwegein (NL)

( * ) Notice: Subject to any disclaimer, the term of this patent is extended or adjusted under 35 U.S.C. 154(b) by 946 days.

(21) Appl. No.: 17/776,233

(22) PCT Filed: Nov. 16, 2020

(86) PCT No.: PCT/EP2020/082283
§ 371 (c)(1),
(2) Date: May 12, 2022

(87) PCT Pub. No.: WO2021/099270
PCT Pub. Date: May 27, 2021

(65) Prior Publication Data

US 2023/0312937 A1 Oct. 5, 2023

(30) Foreign Application Priority Data

Nov. 18, 2019 (EP) .................................... 19209807

(51) Int. Cl.

| | |
|---|---|
| ***C08K 7/20*** | (2006.01) |
| ***C09D 5/33*** | (2006.01) |
| ***C09D 7/40*** | (2018.01) |
| ***C09D 7/43*** | (2018.01) |

(52) U.S. Cl.
CPC ............... *C09D 5/004* (2013.01); *C09D 7/43* (2018.01); *C09D 7/69* (2018.01); *C09D 7/70* (2018.01); *C08K 7/20* (2013.01)

(58) Field of Classification Search
CPC ........................................................ C08K 7/20
See application file for complete search history.

(56) References Cited

U.S. PATENT DOCUMENTS 5,543,177 A * 8/1996 Morrison ............... G03G 13/22 347/100
5,660,497 A 8/1997 Kozak et al.

FOREIGN PATENT DOCUMENTS

| | | | |
|---|---|---|---|
| JP | 2002534576 | A | 10/2002 |
| JP | 2003213213 | A | 7/2003 |
| JP | 2011206655 | A2 | 10/2011 |
| JP | 2017101194 | A2 | 6/2017 |
| WO | 00/42113 | A1 | 7/2000 |
| WO | 01/16223 | A1 | 3/2001 |
| WO | 2004/017104 | A2 | 2/2004 |

OTHER PUBLICATIONS

Machine translation of JP 2017/101194 A published Jun. 8, 2017.*

* cited by examiner

*Primary Examiner* — Vickey Nerangis
(74) *Attorney, Agent, or Firm* — DINSMORE & SHOHL LLP

(57) ABSTRACT

The invention relates to an aqueous pseudoplastic gel composition, having a first viscosity $\eta_1$ at a shear rate of 0.01 $s^{-1}$ of between 5 and 200 Pa·s and a second viscosity $\eta_2$ at a shear rate of 100 $s^{-1}$ that is between 10 and 1000 times lower than the first viscosity, wherein the aqueous pseudoplastic gel consists of, based on the total weight of the composition:

15-60 wt. % of water;

20-60 wt. % of spherical glass beads having a median particle diameter D50, as measured with laser diffraction, between 5 and 150 μm, and a refractive index, measured at a wavelength λ of 589 nm, between 1.8 and 2.8;

0.15-1.5 wt. % of a thickener; and 0-50 wt. % of one or more further ingredients.

The invention further relates to methods for its preparation. The invention further concerns a process for coating a substrate with a retroreflective layer using said aqueous pseudoplastic gel composition and to substrates coated with a retroreflective layer obtainable by said process.

12 Claims, 2 Drawing Sheets

RETROREFLECTIVE AQUEOUS PSEUDOPLASTIC GEL COMPOSITION FOR INDUSTRIAL SPRAYING

CROSS REFERENCES TO RELATED APPLICATIONS

This application is a national-stage application under 35 U.S.C. § 371 of International Application No. PCT/EP2020/082283, filed Nov. 16, 2020, which International Application claims benefit of priority to European Patent Application No. 19209807.7, filed Nov. 18, 2019.

FIELD OF THE INVENTION

The invention relates to an aqueous pseudoplastic gel composition and to methods for its preparation. The invention further relates to a process for coating a substrate with a retroreflective layer using said aqueous pseudoplastic gel composition and to substrates coated with a retroreflective layer obtainable by said process.

BACKGROUND OF THE INVENTION

Retroreflective paints, inks and coatings are used in a variety of applications. For example to improve the visibility of road signs, road markers, textiles, cars, et cetera, under dark conditions. Paints, inks and coatings are typically provided with retroreflective properties by adding spherical glass beads having a specific refractive index. Retroreflection occurs by the tandem action of refraction of the incident light through the upper surface of a spherical glass bead, internal reflection from the lower onside surface of the spherical glass bead and subsequent refraction of the light as it exits the upper surface of the spherical glass bead, travelling back to the direction from which the impinging light came.

WO2004/017104A2 discloses retroreflective compositions comprising retroreflective microspheres, a binder system and a thixotropic blend comprising at least two thixotropic agents in an amount of from about 2 to about 5 wt. %, based on the retroreflective composition. The composition can comprise water. The retroreflective compositions are intended to be used as paints, inks and coatings and are applied to a substrate using aerosols applicators with a propellant. Table 1 of WO2004/017104A2 discloses typical and preferred amounts of the classes of ingredients in the compositions. Example 1 of WO2004/017104A2 discloses a composition wherein the solvent is an undefined aliphatic or aromatic naphtha, the solid resin granules are of an undefined acrylic type, the first thixotrope is of an undefined polyurea type, and the second thixotrope is of an undefined calcium sulphonate complex. The accompanying viscosity of the composition of Example 1, measured with Brookfield #Ospindle at 25° C. would be between 9000 and 30000 cps at 0.5 rpm and between 600 and 1900 cps at 20 rpm.

WO01/16223A1 concerns retroreflective inks for printing on textiles. The single example of WO01/16223A1 discloses a screen printing ink. This screen printing ink consists of:

3 parts of 409 AG Reflective Clear LF base (comprising water and spherical glass beads and a matrix material);

1 part Grancill PWX binding and finishing agent (comprising water as a volatile component); and 2 vol. % of CX100 cross link, based on the combined volume of 409 AG Reflective Clear LF base and Grancill PWX.

It is described that the viscosity of the 409 AG Reflective Clear LF base is approximately 0.090 to 0.110 centistokes. The kinematic viscosity ν [cSt] is related to the dynamic viscosity μ[Pa·s] as follows:

$$\nu[cSt]=1.10^{+6}\mu[Pa\cdot s]/\rho[kg/m^3]$$

Given a realistic estimate of the density ρ of 409 AG Reflective Clear LF base of 1300 g/m$^3$, the dynamic viscosity μ of 409 AG Reflective Clear LF base is between 0.12 en 0.14 mPa·s. As will be appreciated by the skilled person, a viscosity that is more than 7 times lower than that of water is simply not possible for a mixture of water, (a considerable amount of) glass beads, binding agent, finishing agent and further volatile components. The viscosity of the final screen printing ink is not disclosed in the example of WO01/16223A1. Screen printing is a printing technique wherein a mesh is used to transfer paste-like ink onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed. As is generally known to the skilled person in the field of printing, the rheological characteristics of screen printing inks and inks for professional or industrial (high-speed) spraying are fundamentally different because of the distinct techniques used to apply them to a substrate. Screen printing inks are not suitable for professional or industrial (high-speed) spraying.

WO00/42113A1 concerns retroreflective inks comprising microbeads in a liquid carrier medium. The liquid carrier medium can be water. The inks are intended for screen printing on textile. WO00/42113A1 discloses that the viscosity of a screen printing ink is 10 to 30 Pa·s at room temperature as measured with a Brookfield viscometer using a #5 spindle rotating at 10 rpm. The inks disclosed in Tables 1-4 and 6 comprise water, a thickening agent, and glass beads. The viscosities are between 12.3 and 32 Pa·s at room temperature as measured with a Brookfield viscometer using a #5 spindle rotating at 10 rpm. As explained supra, in the context of WO01/16223A1, it is generally known to the skilled person in the field of printing that the rheological characteristics of screen printing inks and inks for professional or industrial (high-speed) spraying are fundamentally different because of the fundamentally different techniques used to apply them to a substrate.

Developing retroreflective compositions having both good stability and sprayability is a challenge because the rheology modifiers needed to keep the retroreflective particles such as spherical glass beads—typically having a density that is substantially higher than that of the fluid carrier—homogeneously distributed across the fluid carrier generally adversely affect the rheological behaviour during spraying.

There is a need for retroreflective inks, coatings and paints that are stable on the shelf and that can still be easily applied to a variety of substrates, preferably using professional or industrial (high-speed) spraying, resulting in retroreflective layers or coatings with good quality.

Accordingly, it is an object of the invention to provide aqueous retroreflective compositions that can be professionally or industrially applied, as a paint, ink or coating, to a variety of substrates, wherein said aqueous retroreflective compositions can be applied to the substrate by spraying, such as professional or industrial (high-speed) spraying, and wherein said aqueous retroreflective compositions have a sufficient stability or shelf-life.

It is a further object of the invention to provide aqueous retroreflective compositions that can be professionally or industrially applied, as a paint, ink or coating, to a variety of substrates by spraying, such as professional or industrial (high-speed) spraying, resulting in good or improved print or coating quality, such as good or improved homogeneity of the layer and retroreflectivity at wide angles, and preferably good or improved smoothness and cleanability of the layer.

SUMMARY OF THE INVENTION

The inventors have unexpectedly established that one or more of the objectives can be met by using a aqueous retroreflective composition that is an aqueous pseudoplastic gel composition, having a first viscosity $\eta_1$ at a shear rate of 0.01 $s^{-1}$ of between 5 and 200 Pa·s and a second viscosity $\eta_2$ at a shear rate of 100 $s^{-1}$ that is between 10 and 1000 times lower than the first viscosity.

Accordingly, in a first aspect, the invention concerns an aqueous pseudoplastic gel composition, preferably for professional or industrial (high-speed) spraying, having a first viscosity $\eta_1$ at a shear rate of 0.01 $s^{-1}$ of between 5 and 200 Pa·s and a second viscosity $\eta_2$ at a shear rate of 100 $s^{-1}$ that is between 10 and 1000 times lower than the first viscosity, wherein the aqueous pseudoplastic gel consists of, based on the total weight of the composition:

15-60 wt. % of water;

20-60 wt. % of spherical glass beads having a median particle diameter D50, as measured with laser diffraction, between 5 and 150 μm, preferably between 20 and 150 μm, and a refractive index, measured at a wavelength λ of 589 nm, between 1.8 and 2.8, wherein optionally at least part of the spherical glass beads are hemispherically coated with a light-reflective coating;

0.15-1.5 wt. % of a thickener; and 0-50 wt. % of one or more further ingredients;

wherein the viscosity is measured with a rheometer with a plate-plate geometry and a gap distance of 0.5 mm at a temperature of 25° C.

The inventors have established that this aqueous pseudoplastic gel composition can be applied, e.g. using industrial high-speed spraying, to various substrates resulting in retroreflective coating layers with excellent print or coating quality, such as homogeneity and retroreflectivity at wide angles. If the retroreflective coating is provided with one or more further transparent coating layers, a retroreflective layer with high smoothness and good cleanability can be obtained. Unexpectedly, these results can also be obtained when the aqueous pseudoplastic gel composition is applied to the surface of a substrate that is positioned vertically.

In a second aspect, a process is provided for the preparation of the aqueous pseudoplastic gel composition as defined herein, said process comprising the steps of:

(i) adding water, the spherical glass beads as defined herein, the thickener as defined herein and the optional one or more further ingredients as defined herein to a container;

(ii) stirring or homogenizing the mixture obtained in step (i), preferably at a temperature between 15 and 30° C., preferably for a period of between 5 and 15 minutes; and (iii) optionally adjusting the pH prior to or after step (ii), preferably to a value between 6.0 and 11, more preferably to a value between 7.0 and 11.

In a third aspect, a process is provided for the preparation of the aqueous pseudoplastic gel composition as defined herein, said process comprising the steps of:

(i) adding water, the spherical glass beads as defined herein, at least part of the thickener as defined herein and optionally part of the one or more further ingredients as defined herein to a container;

(ii) stirring or homogenizing the mixture obtained in step (i), preferably at a temperature between 15 and 30° C., preferably for a period of between 5 and 15 minutes;

(iii) optionally adjusting the pH prior to or after step (ii), preferably to a value between 6.0 and 11, more preferably to a value between 7.0 and 11;

(iv) adding at least part of the one or more further ingredients as defined herein to the composition obtained in step (ii) or (iii), optionally adding part of the thickener as defined herein and optionally adding water;

(v) stirring or homogenizing the mixture obtained in step (iv), preferably at a temperature between 15 and 30° C., preferably for a period of between 5 and 15 minutes; and (vi) optionally adjusting the pH prior to or after step (v), preferably to a value between 6.0 and 11, more preferably to a value between 7.0 and 11.

In a fourth aspect of the invention, a process is provided for the preparation of the aqueous pseudoplastic gel composition as defined herein, said process comprising the steps of:

(i) adding water, the spherical glass beads as defined herein, at least part of the thickener as defined herein and optionally part of the one or more further ingredients as defined herein to a container;

(ii) stirring or homogenizing the mixture obtained in step (i), preferably at a temperature between 5 and 30° C., preferably for a period of between 5 and 15 minutes, to obtain an intermediate aqueous pseudoplastic gel composition having the composition and properties of the aqueous pseudoplastic gel composition as defined herein;

(iii) optionally adjusting the pH prior to or after step (ii), preferably to a value between 6.0 and 11, more preferably to a value between 7.0 and 11;

(iv) adding at least part of the one or more further ingredients as defined herein to the intermediate aqueous pseudoplastic gel composition obtained in step (ii) or (iii), optionally adding part of the thickener as defined herein and optionally adding water;

(v) stirring or homogenizing the mixture obtained in step (iv), preferably at a temperature between 15 and 30° C., preferably for a period of between 5 and 15 minutes, to obtain the aqueous pseudoplastic gel composition; and (vi) optionally adjusting the pH prior to or after step (v), preferably to a value between 6.0 and 11, more preferably to a value between 7.0 and 11.

In a fifth aspect, the invention concerns a process for coating a substrate with a retroreflective layer, said process comprising the steps of:

a) providing a substrate;

b) optionally applying a primer layer to the substrate of step (a);

c) spraying the aqueous pseudoplastic gel composition as defined herein onto the substrate of step (a) or onto the primed substrate of step (b) to provide a substrate coated with a retroreflective layer;

d) optionally drying the substrate coated with the retroreflective layer obtained in step (c); and e) optionally coating the substrate coated with the retroreflective layer obtained in step (c) or the dried substrate coated with the retroreflective layer obtained in step (d) with one or more further transparent coating layers followed by drying or curing.

In a sixth aspect, the invention concerns substrates coated with a retroreflective layer obtainable by the process for coating a substrate as defined herein.

Definitions

The term 'pseudoplastic gel' as used herein relates to gels that exhibit shear thinning behaviour and that have no yield point.

The term 'shear thinning behaviour' in the context of the pseudoplastic gel of the present invention relates to a reduction of the viscosity when the pseudoplastic gel, initially being in a static situation, is subjected to a shear rate.

The term 'tan(δ)', wherein δ is the phase shift, is defined by the ratio G"/G', as is commonly known in the field of rheology. G" represent the loss modulus and characterizes the viscous character or the liquid-like behaviour of the sample. G' represents the storage modulus and characterizes the elastic character or the solid-like behaviour of the sample. If a sample shows purely viscous behaviour and there is no elastic behaviour, δ=90°, G'=0 and tan(δ)=∞. If a sample shows purely elastic behaviour and there is no viscous behaviour, δ=0°, G"=0 and tan(δ)=0. If the sample has a non-zero phase shift δ of lower than 45°, tan(δ) is lower than 1, G' is larger than G" and the sample shows gel-like behaviour in the sense that elastic behaviour dominates viscous behaviour.

DETAILED DESCRIPTION

Figure 1:
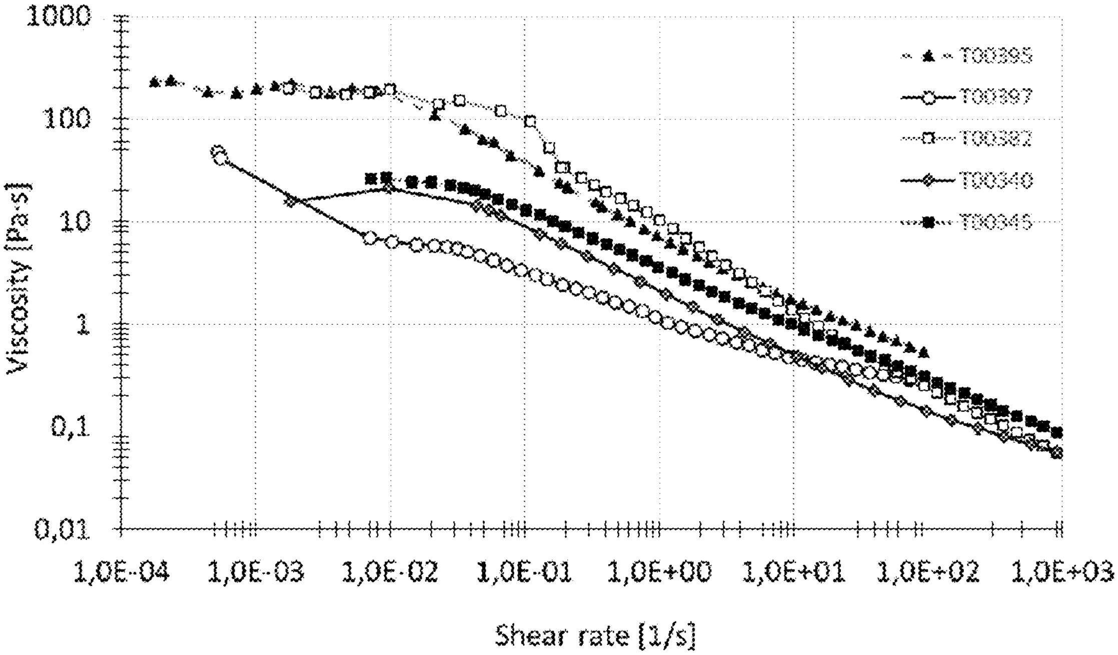
FIG. 1 depicts a viscosity versus shear rate profile of aqueous pseudoplastic gel compositions according to the invention.

In a first aspect, the invention concerns an aqueous pseudoplastic gel composition, preferably for professional or industrial (high-speed) spraying, having a first viscosity $\eta_1$ at a shear rate of 0.01 $s^{-1}$ of between 5 and 200 Pa·s and a second viscosity $\eta_2$ at a shear rate of 100 $s^{-1}$ that is between 10 and 1000 times lower than the first viscosity, wherein the aqueous pseudoplastic gel consists of, based on the total weight of the composition:

15-60 wt. % of water;

20-60 wt. % of spherical glass beads having a median particle diameter D50, as measured with laser diffraction, between 5 and 150 μm, preferably between 20 and 150 μm, and a refractive index, measured at a wavelength λ of 589 nm, between 1.8 and 2.8, wherein optionally at least part of the spherical glass beads are hemispherically coated with a light-reflective coating;

0.15-1.5 wt. % of a thickener; and 0-50 wt. % of one or more further ingredients;

wherein the viscosity is measured with a rheometer with a plate-plate geometry and a gap distance of 0.5 mm at a temperature of 25° C.

In preferred embodiments, the aqueous pseudoplastic gel composition is stable for at least 1 day, more preferably at least 2 days, at least 5 days, at least 10 days, at least 1 month, at least 2 months, at least 6 months, at least 1 year, at least 2 years, wherein the composition is considered stable if upon visual and tactile inspection no sedimentation, no syneresis and no separation can be observed.

The aqueous pseudoplastic gel composition as defined herein preferably is an ink, a paint or a coating formulation.

Spherical Glass Beads

As defined hereinbefore, the refractive index of the spherical glass beads, measured at a wavelength λ of 589 nm, is between 1.8 and 2.8.

The term 'glass' in 'spherical glass beads' as used herein refers to non-crystalline, amorphous solid and transparent material made of oxides. The refractive index of the spherical glass beads is closely related to the density of the glass, although the relationship is not linear. Because of the nature of glass, the density is approximately an additive function of its composition. Densities of spherical glass beads having refractive indices between 1.5 and 2.8 typically vary between 2.5 and 4.5 g/$cm^3$.

Oxides that can be used in glass are oxides of silicon, boron, aluminium, sodium, barium, vanadium, titanium, lanthanum, strontium, zirconium, potassium, magnesium, iron, calcium, zinc, lithium, barium and lead. The spherical glass beads can for example comprise different combinations of silica ($SiO_2$), boric oxide ($B_2O_3$), phosphorous pentoxide ($P_2O_5$), vanadium pentoxide ($V_2O_5$), arsenic trioxide ($As_2O_3$), germanium oxide ($GeO_2$), calcium oxide (CaO), sodium oxide ($Na_2O$), magnesium oxide (MgO), zinc oxide (ZnO), aluminium oxide ($Al_2O_3$), potassium oxide ($K_2O$), iron oxide ($Fe_2O_3$), lead oxide (PbO), barium oxide (BaO), barium titanate ($BaTiO_3$), titanium oxide ($TiO_2$), lithium oxide ($Li_2O$), strontium oxide (SrO), lanthanum oxide ($La_2O_3$), and zirconium oxide ($ZrO_2$). Silica and boric oxide are generally the lowest in density. Glasses containing large weight percentages of these oxide therefore generally result in glass beads with low refractive indices. The refractive indices can be increased by adding oxides with higher molecular weights.

Preferably, the spherical glass beads do not comprise PbO.

Glass beads having refractive indices in the range of 1.5-2.51 and their composition in terms of oxides are disclosed in WO2014/109564A1, which is incorporated herein by reference in its entirety. PbO-free transparent glass beads with refractive indices of above 2.15 are disclosed in U.S. Pat. No. 4,082,427, which is incorporated herein by reference in its entirety.

The spherical glass beads may be coloured spherical glass beads as long as they remain transparent. Both coloured spherical glass beads made from coloured transparent glass and spherical glass beads provided with a concentric transparent coloured coating are encompassed by the invention. The colour may be the natural colour caused by the composition of the oxides or may be deliberately chosen by adding ingredients having a specific colour. Coloured glass beads having high refractive indices and high transparency are disclosed in WO2014/109564A1.

Accordingly, in an embodiment, at least part of the spherical glass beads are spherical glass beads made from coloured transparent glass and/or at least part of the spherical glass beads is provided with a concentric transparent coloured coating.

The spherical glass beads have a median particle diameter D50, as measured with laser diffraction. Accordingly, the median particle diameter D50 is a volume median, based on a volume distribution. The median particle diameter D50 is the diameter where half of the population of spherical glass beads lies below. This volume median particle diameter is often referred to in the art as Dv50 or $D_{v0.5}$.

In a preferred embodiment, the spherical glass beads have a median particle diameter D50, as measured with laser diffraction, between 25 and 100 µm, preferably between 30 and 75 µm, more preferably between 35 and 50 µm.

In another preferred embodiment, the spherical glass beads have a median particle diameter D50, as measured with laser diffraction, between 5 and 100 µm, such as between 5 and 75 µm, between 5 and 50 µm, between 5 and 45 µm, between 5 and 40 µm or between 5 and 35 µm.

In yet another preferred embodiment, the spherical glass beads have a median particle diameter D50, as measured with laser diffraction, between 25 and 150 µm, such as between 50 and 150 µm, between 75 and 150 µm, between 100 and 150 µm, between 110 and 150 µm or between 115 and 150 µm.

The diameters D10 and D90 are often referred to in the art as Dv10 or $D_{v0.1}$ and Dv90 or $D_{v0.9}$, respectively. The D10 diameter is the diameter where 10% of the population of spherical glass beads lies below. Similarly, the D90 diameter is the diameter where 90% of the population of spherical glass beads lies below.

The span, as measured by laser diffraction, of the particle size distribution of the spherical glass beads is defined by:

$$\text{span} = \frac{D90 - D10}{D50}$$

In still further preferred embodiments, the spherical glass beads have a median particle diameter D50, as measured with laser diffraction, between 25 and 100 µm and a span between 0 and 1, preferably between 0 and 0.7, more preferably between 0 and 0.5, still more preferably between 0 and 0.2, even more preferably between 0 and 0.1. In a more preferred embodiment, the spherical glass beads have a median particle diameter D50, as measured with laser diffraction, between 30 and 75 µm and a span between 0 and 1, preferably between 0 and 0.7, more preferably between 0 and 0.5, still more preferably between 0 and 0.2, even more preferably between 0 and 0.1. In a still more preferred embodiment, the spherical glass beads have a median particle diameter D50, as measured with laser diffraction, between 35 and 50 and a span between 0 and 1, preferably between 0 and 0.7, more preferably between 0 and 0.5, still more preferably between 0 and 0.2, even more preferably between 0 and 0.1.

In another more preferred embodiment, the spherical glass beads have a median particle diameter D50, as measured with laser diffraction, between 5 and 35 µm and a span between 0 and 2, such as between 0 and 1.8, between 0 and 1.5, between 0 and 1.25 and between 0 and 1, or such as between 0.5 and 2, between 1 and 2 and between 1.25 and 2.

In another still more preferred embodiment, the spherical glass beads have a median particle diameter D50, as measured with laser diffraction, between 10 and 25 µm and a span between 0 and 2, such as between 0 and 1.8, between 0 and 1.5, between 0 and 1.25 and between 0 and 1, or such as between 0.5 and 2, between 1 and 2 and between 1.25 and 2.

As will be appreciated by those skilled in the art, span=0 corresponds to monodisperse spherical glass beads.

In a preferred embodiment, at least part of the spherical glass beads are hemispherically coated with a light-reflective coating. An example is a hemispherical aluminium coating. Although this is possible, it is not essential to provide the effects as described herein. Accordingly, in an embodiment, the spherical glass beads are not hemispherically coated with a light-reflective coating.

In a preferred embodiment, the amount of the spherical glass beads is 25-55 wt. %, more preferably 26-52 wt. %, even more preferably 27-50 wt. %, based on the total weight of the aqueous pseudoplastic gel composition.

In embodiments, the amount of the spherical glass beads is 20-55 wt. %, 20-50 wt. %, 20-45 wt. %, 20-40 wt. %, 20-35 wt. %, 20-30 wt. % or 20-25 wt. %, based on the total weight of the aqueous pseudoplastic gel composition.

In other embodiments, the amount spherical glass beads is 22-60 wt. %, 25-60 wt. %, 30-60 wt. %, 35-60 wt. %, 40-60 wt. %, 45-60 wt. %, 50-60 wt. % or 55-60 wt. %, based on the total weight of the aqueous pseudoplastic gel composition.

The particular application of the aqueous pseudoplastic gel composition determines the optimum refractive index of the spherical glass beads. If the composition is to be applied in a dry environment or onto a substrate that is to show retroreflectivity under dry conditions and wherein the applied layer of retroreflective spherical glass beads is not coated by a further layer, the refractive index of the spherical glass beads, measured at a wavelength $\lambda$ of 589 nm, can be between 1.8 and 2.8.

In an embodiment, the aqueous pseudoplastic gel composition as defined herein comprises spherical glass beads having a refractive index, measured at a wavelength $\lambda$ of 589 nm, between 1.8 and 2.0.

If, on the other hand, the composition is to be applied in a wet environment or onto a substrate that is to show retroreflectivity under wet conditions or the applied layer of retroreflective spherical glass beads is coated by one or more further transparent layers, the refractive index of the spherical glass beads, measured at a wavelength $\lambda$ of 589 nm, preferably is between 2.0 and 2.8, more preferably between 2.2 and 2.4. Compositions that are to show retroreflectivity under both dry and wet conditions and wherein the applied layer of retroreflective spherical glass beads is coated or is not coated by one or more further transparent layers can comprise different types of glass beads having different refractive indices, and optionally different sizes. In an embodiment, the aqueous pseudoplastic gel composition as defined herein comprises spherical glass beads having a refractive index, measured at a wavelength $\lambda$ of 589 nm, between 2.0 and 2.8, preferably between 2.2 and 2.4.

In another embodiment, the aqueous pseudoplastic gel composition as defined herein comprises at least two types of spherical glass beads wherein at least one type of spherical glass beads has a refractive index, measured at a wavelength $\lambda$ of 589 nm, between 1.8 and lower than 2.0 and at least one further type of spherical glass beads has a refractive index, measured at a wavelength $\lambda$ of 589 nm, between 2.0 and 2.8.

Thickener

The aqueous pseudoplastic gel composition comprises a thickener. Without wishing to be bound by any theory, it is believed that the thickener limits or prevents settling and/or sedimentation of the spherical glass beads and optionally of further particulate matter in the aqueous pseudoplastic gel composition. Moreover, again without wishing to be bound by any theory, it is believed that the thickener provides the gel composition with shear-thinning behaviour.

In embodiments, the thickener encompasses mixtures of different thickeners. In preferred embodiments, the thickener consists of a single thickener.

One preferred group of thickeners are ASE polymers (Alkali Swellable Emulsion; these polymers are produced using emulsion polymerization). ASE polymers are based on a balance of hydrophilic (meth)acrylic acid monomers and hydrophobic (meth)acrylate ester monomers and can be supplied at high volume solids in liquid form. ASE polymers rely on a change from low to high pH (neutralization) to trigger thickening. The 'trigger' is built into the polymer by creating an approximately 50:50 ratio of (meth)acrylic acid, which is soluble in water, and a (meth)acrylate ester, which is not soluble in water. When the acid is un-neutralized (low pH), the polymer is insoluble in water and does not thicken. When the acid is fully neutralized (high pH), the polymer becomes soluble and thickens. ASE polymers are supplied at low pH (<5) and maintain a low as-supplied viscosity (<100 cP) at solids of up to 35%. When subject to a pH of about 7 or higher, ASE polymers solubilize, swell, and thicken the composition through volume exclusion. The degree of thickening can be related to the molecular weight of the polymer. Because their performance depends on water absorption and swelling, ASE polymers tend to be very high in molecular weight, which allows them to thicken efficiently. The rheology profiles ASE polymers create are typically steeply shear-thinning (pseudoplastic), and thus ASE polymers are well suited to build high viscosity at very low shear rates.

In an embodiment, the hydrophilic monomers of the ASE polymer are chosen from the group consisting of (meth) acrylic acid, maleic acid and combinations thereof.

In another embodiment, the hydrophobic monomers of the ASE polymer are chosen from the group consisting of the esters of (meth)acrylic acid with $C_1$- to $C_4$-alcohols, in particular of ethyl acrylate, butyl acrylate, and methyl methacrylate.

In still another preferred embodiment, the hydrophilic monomers of the ASE polymer are chosen from the group consisting of (meth)acrylic acid, maleic acid and combinations thereof and the hydrophobic monomers of the ASE polymer are chosen from the group consisting of the esters of (meth)acrylic acid with $C_1$- to $C_4$-alcohols, in particular ethyl acrylate, butyl acrylate, and methyl methacrylate.

In an embodiment, the ASE polymer is a copolymer consisting of 10-90 wt. %, based on the weight of the ASE polymer, of repeating units based on one or more hydrophilic monomers A and 10-90 wt. % of repeating units based on one or more hydrophobic monomers B, wherein the amounts of the monomers A and B add up to 100 wt %:

(A)

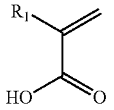

(B)

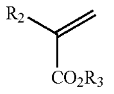

wherein $R_1$ and $R_2$ are independently hydrogen or methyl and wherein $R_3$ is $C_1$- to $C_4$-alkyl.

Another preferred group of thickeners are HASE polymers (Hydrophobically-modified Alkali Swellable Emulsion, these polymers are produced using emulsion polymerization). HASE polymers are copolymers that build on the ASE polymer chemistry by adding one or more hydrophobic associative monomers, such as an acrylic ester and/or vinyl ester monomer, to the ASE polymer composition. HASE polymers retain the pH dependent behaviour of their ASE counterparts, but in addition to absorbing water, HASE polymers also thicken via hydrophobic association. This mechanism is known as associative thickening (i.e. associating with any hydrophobic moiety in the composition).

The hydrophilic and hydrophobic monomers of the HASE polymers can be the same as described with respect to the ASE polymers. Preferred hydrophobic associative monomers are (meth)acrylic ester monomers of (meth)acrylic acid and $C_8$-$C_{22}$-alcohols and/or vinyl ester monomers of (substituted) vinyl alcohols and $C_8$-$C_{22}$-alkyl acids. In another preferred embodiment, the one or more hydrophobic associative monomers are selected from the group consisting of steareth-20 methacrylate, beheneth-25 methacrylate, vinyl neodecanoate, and combinations thereof.

In an embodiment, the HASE polymer is a copolymer consisting of 10-90 wt. %, based on the weight of the HASE polymer, of repeating units based on one or more hydrophilic monomers A as defined hereinbefore, 10-90 wt. % of repeating units based on one or more hydrophobic monomers B as defined hereinbefore, and 0.01 to 2 wt. % of repeating units based on one or more hydrophobic associative monomers C and/or D, wherein the amounts of the monomers A, B, C and D add up to 100 wt %:

(C)

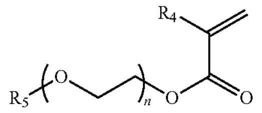

(D)

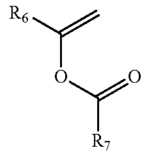

wherein $R_4$ is hydrogen or methyl, wherein $R_5$ is $C_8$- to $C_{22}$-alkyl, wherein n is an integer from 0 to 50, wherein $R_6$ is hydrogen or methyl and wherein $R_7$ is $C_8$- to $C_{22}$-alkyl.

Yet another preferred group of thickeners are Hydrophobically-modified Ethoxylated URethane (HEUR) polymers. Unlike ASE or HASE-type thickeners, HEUR polymers are non-ionic and soluble at any pH. This solubility is due to the polymer's ethylene oxide backbone, which is water soluble and makes up the majority of the polymer structure. Thus, HEUR polymers require a hydrophobic moiety in the composition to interact with the ethylene oxide backbone to impart structure.

Examples of ASE polymers include Rheovis® 1125 (available from BASF Corporation), ACULYN™ 33; ACULYN™ 38, ACUSOL™ 810A, ACUSOL™ 830, ACUSOL™ 835, ACUSOL™ 842 (all available from DOW Chemical), and Carbopol® Aqua 30 polymer (from Lubrizol Corporation).

Examples of HASE polymers include ACULYN™ Excel, ACRYSOL™ TT615, ACULYN™ 22; ACULYN™ 88, ACUSOL™ 801S, ACUSOL™ 805S, ACUSOL™ 820 and ACUSOL™ 823 (all available from DOW Chemical).

Examples of HEUR polymers include ACUSOL™ 880, ACUSOL™ 882, ACULYN™ 44 and ACULYN™ 46N (all available from DOW Chemical).

In yet another embodiment, the thickener is selected from the group consisting of acrylates crosspolymers, crosslinked polyacrylic acid polymers and crosslinked polyacrylic acid copolymers, particularly from the Carbopol® Polymer products from Lubrizol Corporation, such as Carbopol® AQUA SF-1 Polymer, Carbopol® AQUA SF-1 OS Polymer and Carbopol® Aqua SF-3 Polymer.

In still another embodiment, the thickener is selected from the group consisting of liquid acrylic crosslinked or copolymer dispersions.

In yet another embodiment, the thickener is chosen from non-ionic aqueous emulsions of a modified ethylene vinyl acetate copolymer wax, such as Aquatix 8421, available from BYK. In yet another embodiment, the thickener is chosen from modified urea or urea-modified polyamides, such as Rheobyk-420, available from BYK.

In an embodiment, the thickener is chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

In another embodiment, the thickener is chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, and combinations thereof.

In another embodiment, the thickener is chosen from the group consisting of ASE polymers, HASE polymers, HEUR polymers, liquid acrylic crosslinked or copolymer dispersions, crosslinked polyacrylic acid polymers, crosslinked polyacrylic acid copolymers, and combinations thereof.

In yet another embodiment, the thickener is selected from the group consisting of ASE polymers, HASE polymers, and combinations thereof. In an embodiment, the thickener is selected from the group consisting of ASE polymers, and combinations thereof. In another embodiment, the thickener is selected from the group consisting of HASE polymers, and combinations thereof.

In a preferred embodiment, the amount of the thickener is 0.20-1.4 wt. %, more preferably 0.25-1.3 wt. %, even more preferably 0.30-1.2 wt. %, based on the total weight of the aqueous pseudoplastic gel composition.

In embodiments, the amount of the thickener is 0.15-1.4 wt. %, 0.15-1.3 wt. %, 0.15-1.2 wt. %, 0.15-1.1 wt. %, 0.15-1.0 wt. %, 0.15-0.9 wt. %, 0.15-0.8 wt. %, 0.15-0.7 wt. %, 0.15-0.6 wt. %, 0.15-0.55 wt. %, 0.15-0.5 wt. % or 0.15-0.45 wt. %, based on the total weight of the aqueous pseudoplastic gel composition.

In other embodiments, the amount of the thickener is 0.20-1.5 wt. %, 0.25-1.5 wt. %, 0.30-1.5 wt. %, 0.35-1.5 wt. %, 0.40-1.5 wt. %, 0.45-1.5 wt. %, 0.50-1.5 wt. %, 0.55-1.5 wt. % or 0.6-1.5 wt. %, based on the total weight of the aqueous pseudoplastic gel composition.

The amount of water in the aqueous pseudoplastic gel composition is independently specified. If a thickener is applied in the form or for example a dispersion in water, the amount of thickener as defined hereinbefore concerns the dry weight of the thickener.

Further Ingredients

In a preferred embodiment, the one or more further ingredients are chosen from the group consisting of humectants, preservatives, dyes, luminescent agents such as phosphorescent agents and fluorescent agents, pigments, UV-absorbers, binders and resins, mica flake pigments and metal flakes or powders.

Non-limiting examples of humectants that can be used are 2,3-propanediol, ethylene glycol and butylene glycol.

Examples of binders and resins that can be used are water-borne binders and resins, such as aqueous dispersions of binders and resins.

Metal flakes or powders can be used as reflective pigments. Examples are aluminium, bronze, copper, gold, silver, tin and nickel flakes, preferably aluminium flakes. The size of the flakes is typically substantially smaller than that of the spherical glass beads.

Mica flake pigment can also be used as reflective pigment, such as pearlescent pigments based on mica flakes.

In embodiments, the amount of the one or more further ingredients is 0-45 wt. %, 0-40 wt. %, 0-35 wt. %, 0-30 wt. %, 0-25 wt. %, 0-20 wt. %, 0-15 wt. %, 0-10 wt. % or 0-5 wt. %, based on the total weight of the aqueous pseudoplastic gel composition.

In other embodiments, the amount of the one or more further ingredients is 5-50 wt. %, 10-50 wt. %, 15-50 wt. %, 20-50 wt. %, 25-50 wt. %, 30-50 wt. %, 35-50 wt. %, 40-50 wt. % or 45-50 wt. %, based on the total weight of the aqueous pseudoplastic gel composition.

The amount of water in the aqueous pseudoplastic gel composition is independently specified. If one or more further ingredients is/are applied in the form or for example a dispersion in water, the amount of the one or more further ingredients defined hereinbefore concerns the dry weight, i.e. the weight without the water, of the of the one or more further ingredients.

Rheological Behaviour

The aqueous gel composition has pseudoplastic behaviour, meaning that it has shear-thinning behaviour without exhibiting a yield point. This means that the composition is gel-like but still able to flow in a static/stable situation (without shear) and is also gel-like (and able to flow) at increased shear rates. In other words, the aqueous gel composition is gel-like but nevertheless pourable. Moreover, the viscosity decreases when the static/stable situation is perturbed by subjecting the gel to a certain increased shear rate (shear-thinning behaviour).

The aqueous pseudoplastic gel compositions according to the invention are preferably characterized by tan(δ) values, measured with a rheometer with a plate-plate geometry and a gap distance of 0.5 mm at a temperature of 25° C., that are lower than 1 at oscillatory frequencies between 10 and 0.1 Hz. In preferred embodiments, the tan(δ) values, measured with a rheometer with a plate-plate geometry and a gap distance of 0.5 mm at a temperature of 25° C., are between 0.1 and 0.9, more preferably between 0.2 and 0.8 at oscillatory frequencies between 10 and 0.1 Hz.

As will be appreciated by those skilled in the art, tan(δ) values are measured at suitable shear strains in the linear viscoelastic range.

As defined hereinbefore, the aqueous pseudoplastic gel composition has a first viscosity at a shear rate of 0.01 $s^{-1}$ of between 5 and 200 Pa·s and a second viscosity $\eta_2$ at a shear rate of 100 $s^{-1}$ that is between 10 and 1000 times lower than the first viscosity. In a preferred embodiment, the first viscosity is between 10 and 190 Pa·s, more preferably between 14 and 180 Pa·s, even more preferably between 16 and 150 Pa·s, still more preferably between 18 and 120 Pa·s, yet more preferably between 20 and 80 Pa·s. In another preferred embodiment, the second viscosity is between 0.05 and 2 Pa·s, more preferably between 0.08 and 1 Pa·s, even more preferably between 0.1 and 0.8 Pa·s, still more preferably between 0.12 and 0.7 Pa·s, yet more preferably between 0.15 and 0.6 Pa·s, most preferably between 0.2 and 0.5 Pa·s.

In still another embodiment, the aqueous pseudoplastic gel composition has a first viscosity $\eta_1$ at a shear rate of 0.01 $s^{-1}$ of between 5 and 50 Pa·s and a second viscosity $\eta_2$ at a shear rate of 100 $s^{-1}$ that is between 10 and 200 times lower than the first viscosity.

In still another embodiment, the aqueous pseudoplastic gel composition has a first viscosity at a shear rate of 0.01 $s^{-1}$ of between 5 and 50 Pa·s and a second viscosity $\eta_2$ at a shear rate of 100 $s^{-1}$ that is between 0.15 and 0.6 Pa·s, preferably between 0.2 and 0.5 Pa·s.

In yet another embodiment, the aqueous pseudoplastic gel composition has a first viscosity at a shear rate of 0.01 $s^{-1}$ of between 100 and 200 Pa·s and a second viscosity $\eta_2$ at a shear rate of 100 $s^{-1}$ that is between 200 and 1000 times lower than the first viscosity.

In another embodiment, the aqueous pseudoplastic gel composition has a first viscosity $\eta_1$ at a shear rate of 0.01 $s^{-1}$ of between 100 and 200 Pa·s and a second viscosity $\eta_2$ at a shear rate of 100 $s^{-1}$ that is between 0.15 and 0.6 Pa·s, preferably between 0.2 and 0.5 Pa·s.

The gel-structure and the first viscosity of the aqueous pseudoplastic gel composition determined at a shear rate of 0.01 $s^{-1}$ are sufficient to keep the spherical glass beads and optional further particulate materials in suspension for a prolonged period. The shear rate of 100 $s^{-1}$ is typical for (industrial) spraying conditions under which the aqueous pseudoplastic gel composition can be applied to a substrate. The second viscosity is measured at 100 $s^{-1}$ and is sufficiently low to provide aqueous pseudoplastic gel compositions that can easily be sprayed.

The inventors have established that the aqueous pseudoplastic gel compositions according to the invention recover the first viscosity over a relatively short period of time after applying a shear rate of 100 $s^{-1}$ (thixotropy test). This phenomenon is very advantageous for obtaining smooth and homogeneous layers that do not show sagging behaviour.

Accordingly, in a preferred embodiment, the aqueous pseudoplastic gel composition as defined herein has a third viscosity $\eta_3$ at a shear rate of 0.1 $s^{-1}$, wherein the aqueous pseudoplastic gel composition regains at least 20%, preferably at least 30%, more preferably at least 50%, still more preferably at least 70% of the value of the third viscosity $\eta_3$ within 10 s, preferably within 5 s, more preferably within 2 s from the reduction of the shear rate in step (iii) of the following process comprising the consecutive steps of:

(i) subjecting the aqueous pseudoplastic gel composition to a shear rate of 0.1 $s^{-1}$ for at least 30 seconds and measuring the third viscosity $\eta_3$;
(ii) subjecting the aqueous pseudoplastic gel composition to a shear rate of 100 $s^{-1}$ for 30 seconds;
(iii) reducing the shear rate to 0.1 $s^{-1}$; and
(iv) measuring the viscosity of the aqueous pseudoplastic gel composition as a function of time and comparing it to the value of the third viscosity $\eta_3$;

wherein the viscosity is measured with a rheometer with a plate-plate geometry and a gap distance of 0.5 mm at a temperature of 25° C.

The wording 'regaining at least x % of the value of the third viscosity $\eta_3$ within a certain time' as used in the context of the present invention means that the viscosity actually reaches a value $x \cdot \eta_3/100$ within that time.

This embodiment can also be worded as follows. In a preferred embodiment, the aqueous pseudoplastic gel composition as defined herein has a third viscosity $\eta_3$ at a shear rate of 0.1 $s^{-1}$, wherein the aqueous pseudoplastic gel composition reaches, exhibits or has a fourth viscosity $\eta_4$ of at least 20%, preferably at least 30%, more preferably at least 50%, still more preferably at least 70% of the value of the third viscosity $\eta_3$ within 10 s, preferably within 5 s, more preferably within 2 s from the reduction of the shear rate in step (iii) of the following process comprising the consecutive steps of:

(i) subjecting the aqueous pseudoplastic gel composition to a shear rate of 0.1 $s^{-1}$ for at least 30 seconds and measuring the third viscosity $\eta_3$;
(ii) subjecting the aqueous pseudoplastic gel composition to a shear rate of 100 $s^{-1}$ for 30 seconds;
(iii) reducing the shear rate to 0.1 $s^{-1}$; and
(iv) measuring a fourth viscosity $\eta_4$ of the aqueous pseudoplastic gel composition as a function of time;

wherein the viscosity is measured with a rheometer with a plate-plate geometry and a gap distance of 0.5 mm at a temperature of 25° C.

In embodiments, the aqueous pseudoplastic gel composition regains at least 20%, preferably at least 30%, more preferably at least 50%, even more preferably at least 70%, still more preferably at least 90 wt % of the value of the third viscosity $\eta_3$ within 10 s from the reduction of the shear rate in step (iii).

In embodiments, the aqueous pseudoplastic gel composition regains at least 20%, preferably at least 30%, more preferably at least 50% of the value of the third viscosity $\eta_3$ within 5 s from the reduction of the shear rate in step (iii).

In embodiments, the aqueous pseudoplastic gel composition regains at least 20%, preferably at least 30% of the value of the third viscosity $\eta_3$ within 2 s from the reduction of the shear rate in step (iii).

As will become apparent from the appended examples, the aqueous pseudoplastic gel compositions according to the present invention can regain about 100% of the value of the third viscosity $\eta_3$ after some period of time from the reduction of the shear rate in step (iii).

Process for the Preparation of the Aqueous Pseudoplastic Gel Composition

Generally speaking, the ingredients of the aqueous pseudoplastic gel composition can be added in any order. After mixing all ingredients, the composition is preferably stirred or homogenized at a temperature of between 15 and 30° C., preferably for a period of between 5 and 15 minutes. In a preferred embodiment, the thickener is added after mixing water, spherical glass beads and any further ingredients. Stirring or homogenization is preferably performed at low shear rates to avoid the inclusion of air bubbles in the aqueous pseudoplastic gel composition.

As explained hereinbefore, the thickening effect of the thickener may depend on the value of the pH. Accordingly, the process for the preparation of the aqueous pseudoplastic gel composition may comprise a step of adjusting the pH, for example adjusting the pH to a value between 6.0 and 11, such as between 7.0 and 11, between 7.0 and 9.5 or between 7.4 and 7.9. The pH can suitably be adjusted using diluted NaOH or aminomethyl propanol neutralizers, such as AMP Ultra® PC 2000.

Accordingly, in a second aspect of the invention, a process is provided for the preparation of the aqueous pseudoplastic gel composition as defined herein, said process comprising the steps of:

(i) adding water, the spherical glass beads as defined hereinbefore, the thickener as defined hereinbefore and the optional one or more further ingredients as defined hereinbefore to a container;
(ii) stirring or homogenizing the mixture obtained in step (i), preferably at a temperature between 15 and 30° C., preferably for a period of between 5 and 15 minutes; and
(iii) optionally adjusting the pH prior to or after step (ii), preferably to a value between 6.0 and 11, more preferably to a value between 7.0 and 11.

The pH in step (iii) is preferably adjusted to a value between 7.0 and 9.5.

Adding the different ingredients can however also be performed at different stages of the process. Consequently, in a third aspect of the invention, a process is provided for the preparation of the aqueous pseudoplastic gel composition as defined herein, said process comprising the steps of:

(i) adding water, the spherical glass beads as defined hereinbefore, at least part of the thickener as defined hereinbefore and optionally part of the one or more further ingredients as defined hereinbefore to a container;
(ii) stirring or homogenizing the mixture obtained in step (i), preferably at a temperature between 15 and 30° C., preferably for a period of between 5 and 15 minutes;
(iii) optionally adjusting the pH prior to or after step (ii), preferably to a value between 6.0 and 11, more preferably to a value between 7.0 and 11;
(iv) adding at least part of the one or more further ingredients as defined hereinbefore to the composition obtained in step (ii) or (iii), optionally adding part of the thickener as defined hereinbefore and optionally adding water;
(v) stirring or homogenizing the mixture obtained in step (iv), preferably at a temperature between 15 and 30° C., preferably for a period of between 5 and 15 minutes; and
(vi) optionally adjusting the pH prior to or after step (v), preferably to a value between 6.0 and 11, more preferably to a value between 7.0 and 11.

The pH in step (vi) is preferably adjusted to a value between 7.0 and 9.5.

In embodiments, the time between performing steps (i) to (iii) on the one hand and steps (iv) to (vi) on the other hand may be days or months or even longer.

The process for the preparation of the aqueous pseudoplastic gel composition may also encompass the production of an intermediate aqueous pseudoplastic gel composition having the composition and properties as defined hereinbefore, followed by adding and admixing another composition to obtain a final aqueous pseudoplastic gel composition, with the proviso that the final aqueous pseudoplastic gel composition still has a composition and the properties as defined hereinbefore.

Consequently, in a fourth aspect of the invention, a process is provided for the preparation of the aqueous pseudoplastic gel composition as defined hereinbefore, said process comprising the steps of:

(i) adding water, the spherical glass beads as defined hereinbefore, at least part of the thickener as defined hereinbefore and optionally part of the one or more further ingredients as defined hereinbefore to a container;
(ii) stirring or homogenizing the mixture obtained in step (i), preferably at a temperature between 15 and 30° C., preferably for a period of between 5 and 15 minutes to obtain an intermediate aqueous pseudoplastic gel composition having the composition and properties of the aqueous pseudoplastic gel composition as defined hereinbefore;
(iii) optionally adjusting the pH prior to or after step (ii), preferably to a value between 6.0 and 11, more preferably to a value between 7.0 and 11;
(iv) adding at least part of the one or more further ingredients as defined hereinbefore to the intermediate aqueous pseudoplastic gel composition obtained in step (ii) or (iii), optionally adding part of the thickener as defined hereinbefore and optionally adding water;
(v) stirring or homogenizing the mixture obtained in step (iv), preferably at a temperature between 15 and 30° C., preferably for a period of between 5 and 15 minutes to obtain the aqueous pseudoplastic gel composition; and
(vi) optionally adjusting the pH prior to or after step (v), preferably to a value between 6.0 and 11, more preferably to a value between 7.0 and 11.

The pH in step (vi) is preferably adjusted to a value between 7.0 and 9.5.

In embodiments, the time between performing steps (i) to (iii) on the one hand and steps (iv) to (vi) on the other hand may be days or months or even longer.

Process for Coating a Substrate

In a fifth aspect, the invention concerns a process for coating a substrate with a retroreflective layer, said process comprising the steps of:

a) providing a substrate;
b) optionally applying a primer layer to the substrate of step (a);
c) spraying the aqueous pseudoplastic gel composition as defined hereinbefore onto the substrate of step (a) or onto the primed substrate of step (b) to provide a substrate coated with a retroreflective layer;
d) optionally drying the substrate coated with the retroreflective layer obtained in step (c); and
e) optionally coating the substrate coated with the retroreflective layer obtained in step (c) or the dried substrate coated with the retroreflective layer obtained in step (d) with one or more further transparent coating layers followed by drying or curing.

Step (c) of spraying the aqueous pseudoplastic gel composition can comprise spraying a single layer in one step or multiple layers on top of each other in subsequent spraying steps.

In an embodiment step (b) is performed. The primer layer applied in step (b) can for example be a coloured primer layer comprising mica flake pigments or metal flakes or powders.

The geometry of the substrate to be coated is not limited in any sense as long as it can be coated by spraying, i.e. as long as droplets of the aqueous pseudoplastic gel composition can reach the surface of the substrate. In embodiments, the substrate is planar. In other embodiments the substrate is curved. In further embodiments, the substrate comprises planar parts and curved parts.

The inventors have established that the aqueous pseudoplastic gel composition can be applied, e.g. using industrial high-speed spraying, to various substrates resulting in retroreflective coating layers with excellent print or coating quality, such as homogeneity and retroreflectivity at wide angles. If the retroreflective coating layer is provided with one or more further transparent coating layers (i.e. step (e) of the process for coating a substrate as defined hereinbefore is performed), a retroreflective layer with high smoothness and good cleanability is obtained. Unexpectedly, these results can also be obtained when the aqueous pseudoplastic gel composition is applied to the surface of a substrate that is positioned vertically.

In preferred embodiments, the substrate is chosen from textiles, leather, metal, concrete, rubber, plastics, carbon fibers, and combinations thereof. Textiles as used herein encompass woven or knitted textile fabrics such as cotton, polyesters, nylon, silk, wool, viscose and acrylics.

Irrespective of the type of material the substrate is made of, the substrate can be chosen from the group consisting of clothes, traffic signs, car chassis, bicycle frames, roads, pavements and guard rails.

A substrate provided with a retroreflective coating in accordance with the present invention may be provided in step (e) with one or more further transparent coating layers. These one or more further transparent coating layers can serve to protect the retroreflective layer against scuffing and/or against moisture. Moreover, they can be used to provide the substrate coated with the retroreflective layer with a specific matte or shiny/glossy appearance. The one or more further transparent coating layers can be coloured. The one or more further transparent coating layers applied in optional step (e) may comprise liquid coating layers, powder coating layers or combinations thereof, that are subsequently cured or dried.

The spraying in step (c) is preferably performed using as spray gun. In an embodiment, spraying is performed using a propellant. In a preferred embodiment spraying is performed without using a propellant.

The drying in optional step (d) and the drying or curing in step (f) can be performed under ambient conditions. Alternatively, it can be performed under increased temperature and/or reduced pressure.

In preferred embodiments, the aqueous pseudoplastic gel composition is applied in step (c) in an amount of 60-250 g per $m^2$ of the substrate, more preferably in an amount of 80-225 g per $m^2$ of the substrate, still more preferably in an amount of 90-205 g per $m^2$ of the substrate. These amounts can be sprayed as a single layer in one step or as multiple layers on top of each other in subsequent spraying steps.

In a sixth aspect, the invention concerns substrates coated with a retroreflective layer obtainable by the process as defined hereinbefore. The substrate coated with the retroreflective layer can have a matte or shiny appearance.

In a preferred embodiment, the substrate coated with the retroreflective layer, preferably coated with one or more further transparent coating layers (i.e. step (e) of the process for coating a substrate as defined hereinbefore is performed), shows retroreflection of the retroreflective layer at any angle between 0 and 80°, such as between 0 and 78°, between 0 and 75, between 0 and 70°, between 0 and 65°, between 0 and 60, between 0 and 55°, between 0 and 50°, between 0 and 45° and between 0 and 40°, from the perpendicular of the coated substrate. This retroreflection of the retroreflective layer is determined by directing the beam of a torch to the retroreflective layer, wherein the sightline of the eyes substantially coincides with the beam of the torch, and by visually determining whether retroreflection is observed. The experiment starts at zero angle with the perpendicular of the coated substrate after which the angle is gradually increased until no retroreflection is discerned anymore.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Example 1

Five aqueous pseudoplastic gel compositions according to the invention were prepared by adding ingredients at ambient temperature (~20° C.) in the following order to a container: (1) demi water, (2) spherical glass beads, (3) further ingredients, (4) thickener. Where necessary, AMP Ultra PC 2000 was added (a further ingredient) to adjust the pH. The resulting mixtures were mixed during about 10 minutes, again at ambient temperature. The amounts of the different ingredients is listed in Table 1. The following ingredients were used.

Spherical Glass Beads:

SFX 2.2, obtained from Jianxi Sunflex Light Retroreflective Material Co, Ltd., having a refractive index of about 2.2, measured at a wavelength λ of 589 nm, having a median particle diameter D50 of 40.37 μm, a D10 diameter of 37.32 μm and a D90 diameter of 44.11 μm, as measured with laser diffraction, and a specific gravity of about 4.5 g/$cm^3$. These spherical glass beads comprise $TiO_2$, BaO, ZnO and CaO.

Further Ingredients

- Kuncai Gold Finch 10-60 μm, obtained from Kuncai; mica
- Syntran KL219 CG, obtained from Interpolymer; film-forming polymer
- Optiphen, obtained from Ashland Specialty Ingredients; preservative
- Syntran 5778, obtained from Interpolymer; film-forming polymer
- Citrofol, obtained from Jungbunzlauer; plasticizer
- Worlee Colour Yellow, obtained from Worlee; pigment
- AMP Ultra PC 2000, obtained from Angus Chemical Company; neutralizer
- Glitsa® Normaal Gebruik Parketlak Kleurloos, obtained from Akzo Nobel; water-borne parquet varnish
- Ceta Bever® Schuur & Tuinhuis Beits, Blank Transparant Zijdeglans, Akzo Nobel; water-borne stain
- Sikkens Autowave™ MM 2.0, obtained from Akzo Nobel, water-borne basecoat for cars Acticide MBL, obtained from Thor; preservative Thickeners

- Carbopol® Aqua SF-1, obtained from Lubrizol, cross-linked acrylate copolymer thickener
- Aquatix 8421, obtained from BYK; thickener, non-ionic aqueous emulsion of a modified ethylene vinyl acetate copolymer wax Rheobyk-420, obtained from BYK, modified urea thickener Rheovis® AS 1152, obtained from BASF, ASE thickener ACULYN™ Excel, obtained from DOW Chemical, HASE thickener

TABLE 1

| Ingredients | T00340 amount [wt. %] | T00345 amount [wt. %] | T00395 amount [wt. %] | T00382 amount [wt. %] | T00397 amount [wt. %] |
|---|---|---|---|---|---|
| | Sample | | | | |
| **Water** | | | | | |
| Water(1) | 34.55 | 46.54 | 48.12 | 49.17 | 53.10 |
| **Spherical glass beads** | | | | | |
| SFX 2.2 | 47.35 | 29.96 | 30.98 | 30.46 | 28.48 |
| **Further ingredients(2)** | | | | | |
| Kuncai Gold Finch 10-60 μm | 5.27 | 6.66 | | | |
| Butylene glycol | 0.53 | 0.67 | | | |
| Syntran KL219 CG | 0.57 | 0.73 | | | |
| Optiphen | 0.32 | 0.40 | | | |
| Syntran 5778 | 9.26 | 11.91 | | | |
| Citrofol | 1.62 | 2.00 | | | |
| Worlee Colour Yellow | 0.07 | 0.11 | | | |
| AMP Ultra | 0.10 | 0.14 | | | |
| Glitsa ® Normaal Gebruik Parketlak | | | 20.24 | | |
| Sikkens Autowave ™ MM 2.0 | | | | 19.12 | |
| Ceta Bever ® Schuur & Tuinhuis Beits | | | | | 17.59 |
| Acticide MBL | | | | 0.01 | |
| AMP Ultra PC 2000 | | | 0.24 | | 0.21 |
| N-methylpyrrolidone(3) | | | | 0.60 | |
| Subtotal further ingredients(2) | 17.74 | 22.62 | 20.48 | 19.72 | 17.80 |
| **Thickener** | | | | | |
| Carbopol Aqua SF-1 | 0.36 | | | | |
| Aquatix 8421 | | 0.88 | | | |
| Rheovis AS 1125 | | | 0.42 | | |
| Rheobyk-420(3) | | | | 0.65 | |
| ACULYN Excel | | | | | 0.62 |
| Subtotal thickener(4) | 0.36 | 0.88 | 0.42 | 0.65 | 0.62 |
| Total composition | 100.00 | 100.00 | 100.00 | 100.00 | 100.00 |

(1)Demi water + water from further ingredients (2)The concentration of further ingredients is based on dry mass. Water is listed separately.

(3)N-methylpyrrolidone is solvent for Rheobyk-420

(4)The concentration of thickeners is based on dry mass. Non-aqueous solvents are listed under 'further ingredients', water is listed separately.

Example 2

Stability of the five aqueous pseudoplastic gel compositions given in Table 1 was measured by visual and tactile inspection of whether the sample shows sedimentation, syneresis or separation (phase or otherwise). A sample is considered stable if upon visual and tactile inspection no sedimentation, no syneresis and no separation can be observed. The pH of the five compositions directly following synthesis and the stability thereafter are listed in Table 2.

TABLE 2

| Sample | T00340 | T00345 | T00395 | T00382 | T00397 |
|---|---|---|---|---|---|
| pH | 7.77 | 7.73 | 8.84 | 8.60 | 8.1 |
| Stability | >49 days | >43 days | 1 day | 11 days | 4 days |

Example 3

The rheological behaviour of the five compositions given in Table 1 was measured using a Malvern Kinexus Rheometer with a plate-plate geometry (PL40 plate) and a gap distance of 0.5 mm at a temperature of 25.0° C.

A viscosity-versus-shear-rate profile of the five aqueous pseudoplastic gel compositions according to the invention was measured at shear rates varying between about 0.0001 $s^{-1}$ and 1000 $s^{-1}$ with 10 samples per decade. The viscosity-versus-shear-rate profiles are given in FIG. 1. As can be inferred from FIG. 1, all aqueous pseudoplastic gel compositions show shear-thinning behaviour. The form of the viscosity versus shear rate profile in the limit of zero shear rate suggests that the compositions have no yield point. The five aqueous pseudoplastic gel compositions were all pourable.

Figure 2:
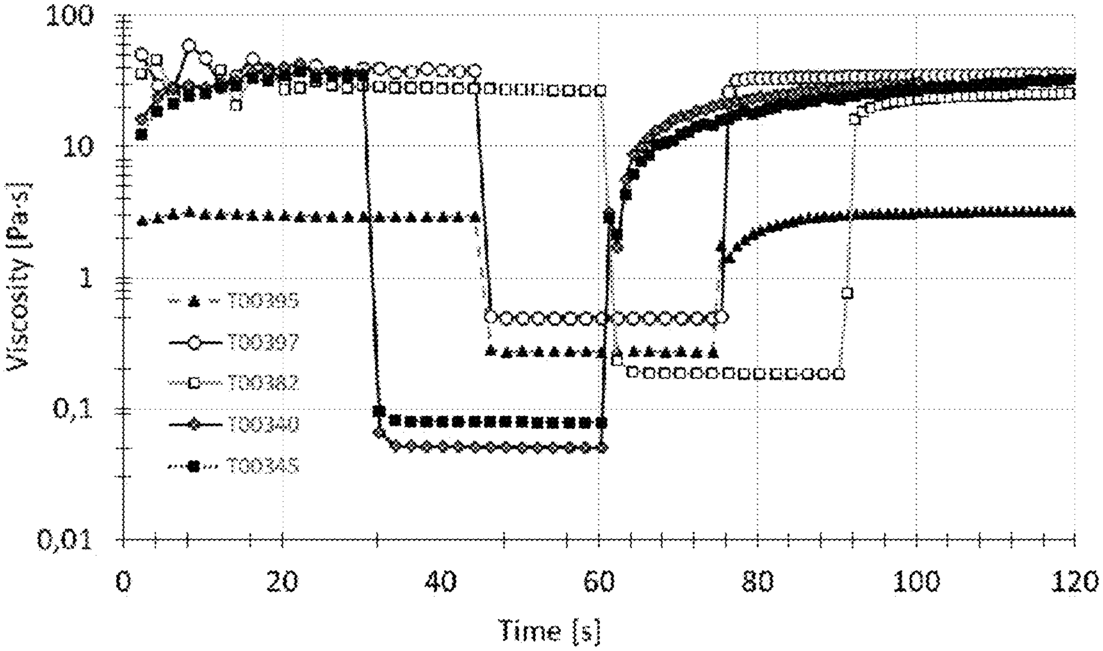
FIG. 2 depicts thixotropic behaviour of the aqueous pseudoplastic gel compositions of FIG. 1.

A thixotropy test was performed by subsequently applying three shear rate regimes and by measuring the viscosity as a function of time. In a first regime, a shear rate of 0.1 $s^{-1}$ was applied during between about 30 and 60 seconds and the viscosity was measured at a sampling interval of 2 seconds. In the second regime, the shear rate was increased to 100 $s^{-1}$ and the viscosity was measured during 30 seconds at a sampling interval of 2 seconds. In a third regime, the shear rate was decreased to 0.1 $s^{-1}$ and the viscosity was measured during 600 seconds at a sampling interval of 1 second. FIG. 2 depicts the thixotropic behaviour of the five aqueous pseudoplastic gel compositions of FIG. 1. As can be inferred from FIG. 2, the aqueous pseudoplastic gel compositions all recover at least 50% of the viscosity measured in the first regime within a few seconds from the start of the third regime. Moreover, the aqueous pseudoplastic gel compositions are able to regain about 100% of the value of the viscosity of the first regime.

Figure 3:
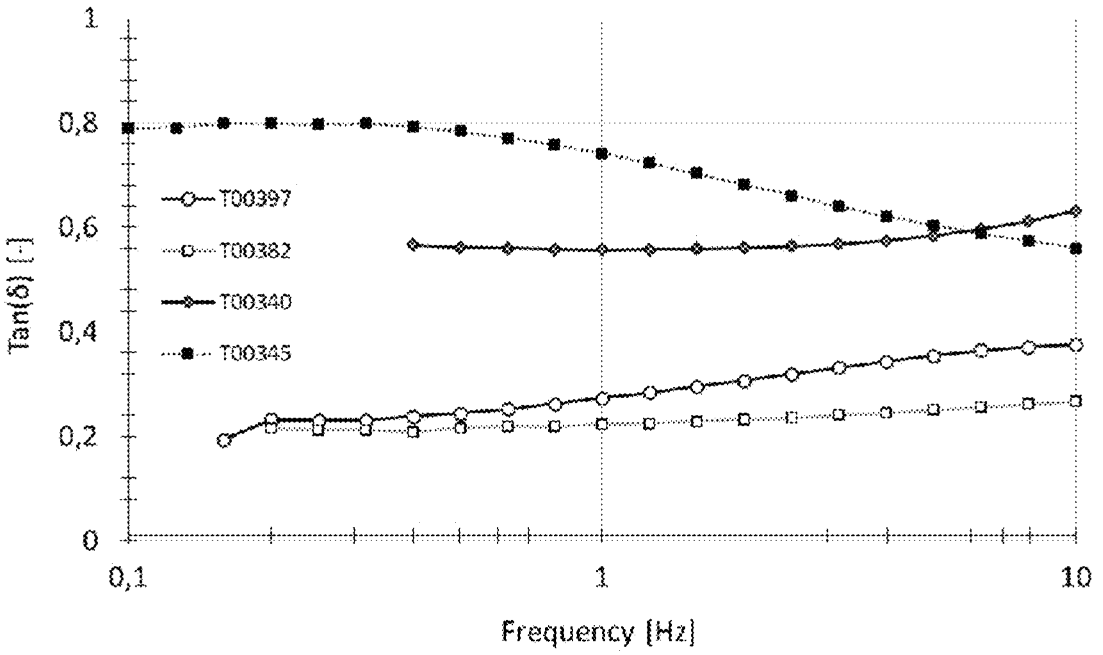
FIG. 3 depicts tan(δ) profiles as a function of oscillatory frequency of aqueous pseudoplastic gel compositions according to the invention.

In addition, frequency sweep tests were performed to evaluate the viscoelastic behaviour of four of the aqueous pseudoplastic gel compositions. Loss modulus G", storage modulus G' and tan(δ) were measured at suitable shear strains in the linear viscoelastic range and at oscillatory frequencies varying between 10 Hz and 0.1 Hz with 10 samples per decade. Results are presented in FIG. 3. The tan(δ) values are all below 1 across the range of oscillatory frequencies, indicating gel-like behaviour in the sense that elastic behaviour dominates viscous behaviour.

Example 4

The five aqueous pseudoplastic gel compositions described in Example 1 were applied to planar metal test plates (10×15 cm), positioned vertically using a spray gun (DeVILBISS HVLP, DV1-C1 Plus) with a nozzle of 1.3 mm at a pressure of 2.2 bar in an amount of about 130 g per $m^2$ of the substrate. The sprayed layers were air dried at ambient temperature. After drying, visually appealing retroreflective layers were obtained with very good quality in terms of smoothness and homogeneity. Consequently, industrial spraying onto substrates that are positioned vertically is possible without leading to for example sagging or inhomogeneous layers.

The metal test plates coated with the five aqueous pseudoplastic gel compositions were further coated with a transparent reactive Sikkens® Aerodry 2 component lacquer (Akzo Nobel) and subsequently cured. Retroreflection of the resulting retroreflective layers was determined by directing the beam of a torch to the retroreflective layer, wherein the sightline of the eyes substantially coincides with the beam of the torch, and by visually determining whether retroreflection is observed. The experiment starts at zero angle with the perpendicular of the coated substrate after which the angle is gradually increased until no retroreflection is discerned anymore. The substrates coated with the retroreflective layers showed a clear retroreflection of the retroreflective layer at all angles between 0 and 80° from the perpendicular of the coated substrate.

Example 5

The viscosities of the compositions in Table 1 of Example 1 were measured with a Brookfield viscometer using a #5 spindle rotating at 10 rpm. Results are given in Table 3.

TABLE 3

| Brookfield viscosity using a #5 spindle rotating at 10 rpm at about 20° C. | |
|---|---|
| Sample | Viscosity |
| T00340 | 2.4 Pa · s |
| T00345 | 2.0 Pa · s |
| T00395 | 1.4 Pa · s |

TABLE 3-continued

| Brookfield viscosity using a #5 spindle rotating at 10 rpm at about 20° C. | |
|---|---|
| Sample | Viscosity |
| T00382 | 5.8 Pa · s |
| T00397 | 6.0 Pa · s |

The resulting Brookfield viscosities using a #5 spindle rotating at 10 rpm are thus between 1.4 and 6 Pa·s, which is far below the lower value required for screen printing (ink) as disclosed in WO00/42113A1.

The invention claimed is:

1. An aqueous pseudoplastic gel composition consisting of, based on the total weight of the composition:

(a) from 15% to 60% by weight water;

(b) from 20% to 60% by weight spherical glass beads having a median particle diameter D50, as measured with laser diffraction, from 5 μm to 150 μm, and a refractive index, measured at a wavelength λ of 589 nm, from 1.8 to 2.8, wherein optionally at least part of the spherical glass beads are hemispherically coated with a light-reflective coating;

(c) from 0.15% to 1.5% by weight of a thickener; and (d) from 0% to 50% by weight of one or more further ingredients;

wherein:

the aqueous pseudoplastic gel composition has a first viscosity $\eta_1$ at a shear rate of 0.01 $s^{-1}$ of from 5 Pa·s to 200 Pa·s and a second viscosity $\eta_2$ at a shear rate of 100 $s^{-1}$ that is from 10 to 1000 times lower than the first viscosity; and each viscosity is measured with a rheometer with a plate-plate geometry and a gap distance of 0.5 mm at a temperature of 25° C.

2. The aqueous pseudoplastic gel composition according to claim 1, having a third viscosity $\eta_3$ at a shear rate of 0.1 $s^{-1}$, wherein the aqueous pseudoplastic gel composition regains at least 20% of the value of the third viscosity $\eta_3$ within 10 s from the reduction of the shear rate in (iii) of a process comprising:

(i) subjecting the aqueous pseudoplastic gel composition to a shear rate of 0.1 $s^{-1}$ for at least 30 seconds and measuring the third viscosity $\eta_3$; then (ii) subjecting the aqueous pseudoplastic gel composition to a shear rate of 100 $s^{-1}$ for 30 seconds; then (iii) reducing the shear rate to 0.1 $s^{-1}$; and then (iv) measuring the viscosity of the aqueous pseudoplastic gel composition as a function of time;

wherein each viscosity is measured with a rheometer with a plate-plate geometry and a gap distance of 0.5 mm at a temperature of 25° C.

3. The aqueous pseudoplastic gel composition according to claim 1, wherein tan(δ) values, measured with a rheometer with a plate-plate geometry and a gap distance of 0.5 mm at a temperature of 25° C., at oscillatory frequencies from 10 Hz to 0.1 Hz are lower than 1.

4. The aqueous pseudoplastic gel composition according to claim 1, wherein the spherical glass beads have a refractive index, measured at a wavelength λ of 589 nm, from 2.0 to 2.8.

5. The aqueous pseudoplastic gel composition according to claim 1, wherein the amount of the thickener is from 0.20% to 1.4% by weight, based on the total weight of the aqueous pseudoplastic gel composition.

6. The aqueous pseudoplastic gel composition according to claim 1, wherein the thickener is selected from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

7. The aqueous pseudoplastic gel composition according to claim 1 which is stable for at least 1 day, wherein the composition is considered stable if upon visual and tactile inspection no sedimentation, no syneresis, and no separation can be observed.

8. The aqueous pseudoplastic gel composition according to claim 1, which is an ink, a paint, or a coating formulation.

9. A process for the preparation of the aqueous pseudoplastic gel composition according to claim 1, the process comprising:

(i) adding water, the spherical glass beads, the thickener and the optional one or more further ingredients to a container to obtain a mixture;

(ii) stirring or homogenizing the mixture obtained in (i); and (iii) optionally adjusting the pH prior to or after (ii).

10. A process for the preparation of the aqueous pseudoplastic gel composition according to claim 1, the process comprising:

(i) adding water, the spherical glass beads, at least part of the thickener and optionally part of the one or more further ingredients to a container to obtain a first mixture;

(ii) stirring or homogenizing the first mixture obtained in (i);

(iii) optionally adjusting the pH prior to or after (ii);

(iv) adding at least part of the one or more further ingredients to the composition obtained in (ii) or (iii), optionally adding part of the thickener and optionally adding water, to obtain a second mixture;

(v) stirring or homogenizing the second mixture obtained in (iv); and (vi) optionally adjusting the pH prior to or after step (v).

11. A process for coating a substrate with a retroreflective layer, the process comprising:

(a) providing a substrate;

(b) optionally applying a primer layer to the substrate to obtain a primed substrate;

(c) spraying the aqueous pseudoplastic gel composition according to claim 1 onto the substrate of (a) or onto the primed substrate of (b) to provide a substrate coated with a retroreflective layer;

(d) optionally drying the substrate coated with the retroreflective layer obtained in (c); and (e) optionally coating the substrate coated with the retroreflective layer obtained in (c) or the dried substrate coated with the retroreflective layer obtained in (d) with one or more further transparent coating layers, followed by drying or curing.

12. The process according to claim 11, wherein the aqueous pseudoplastic gel composition is applied to the substrate in (c) using a spray gun.

* * * * *